Dec. 21, 1937.　　　　　L. C. COLE　　　　　2,103,147
MACHINE TOOL
Original Filed June 14, 1935　　　4 Sheets-Sheet 3
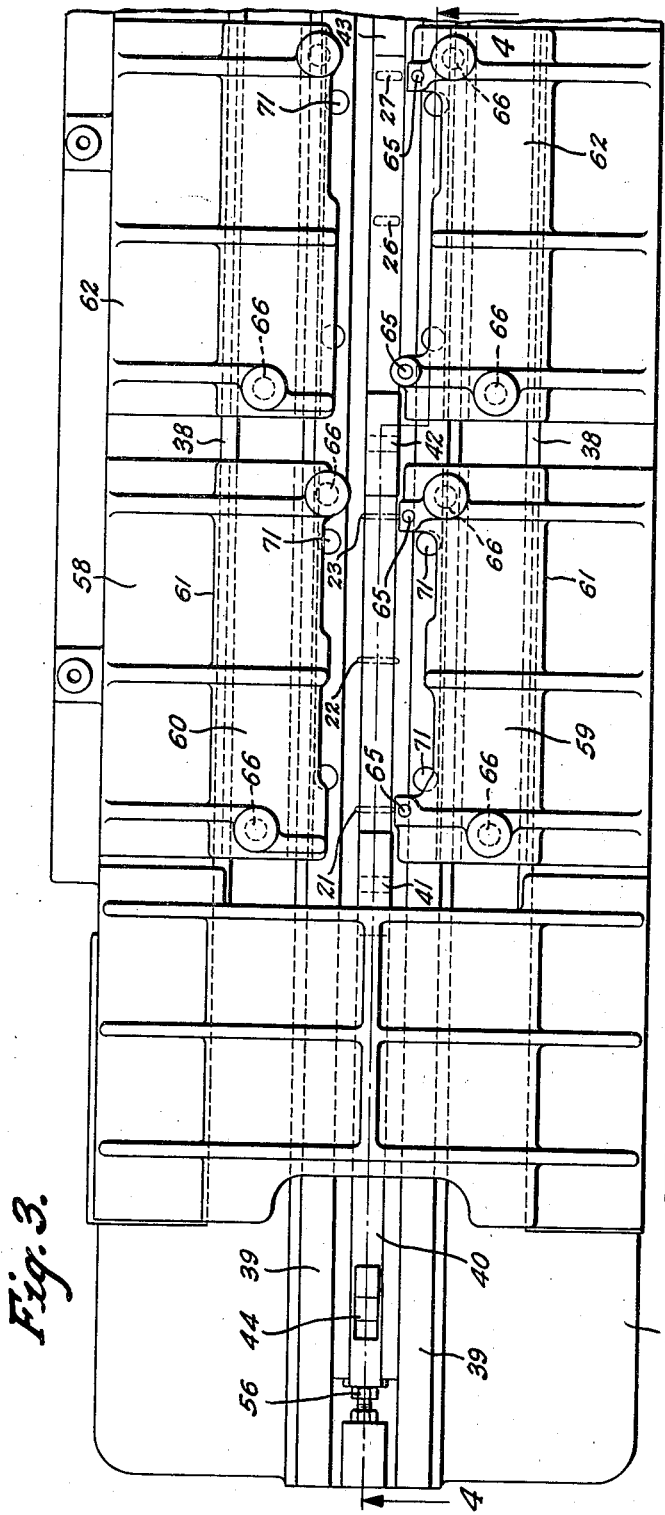
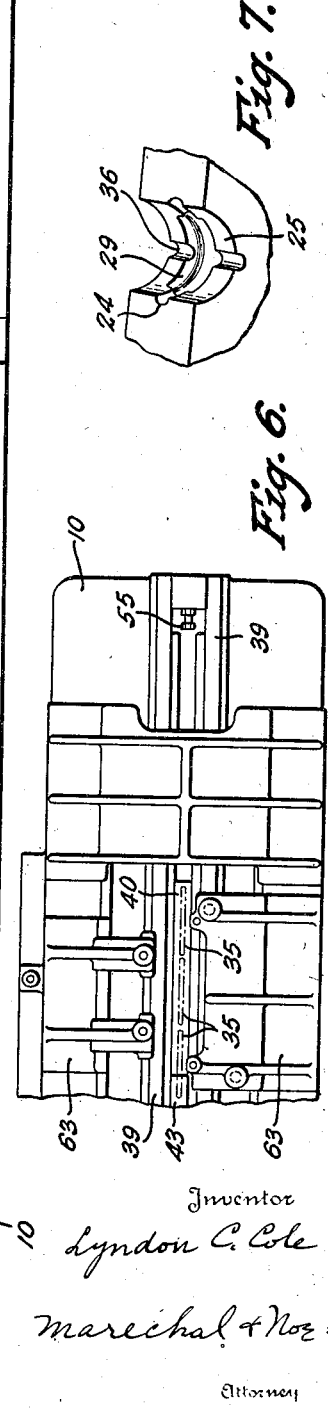
Inventor
Lyndon C. Cole
Marechal & Noe
Attorney

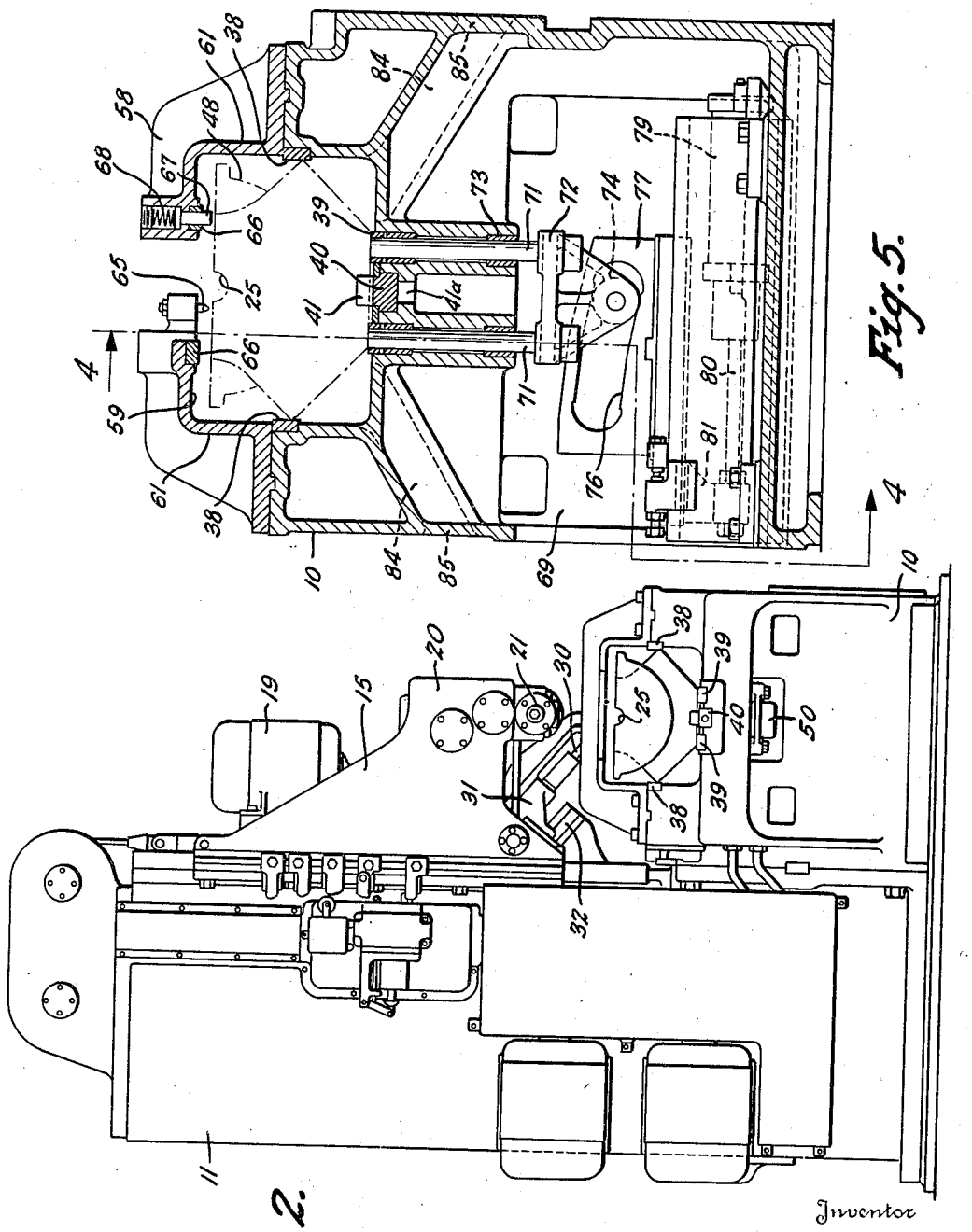

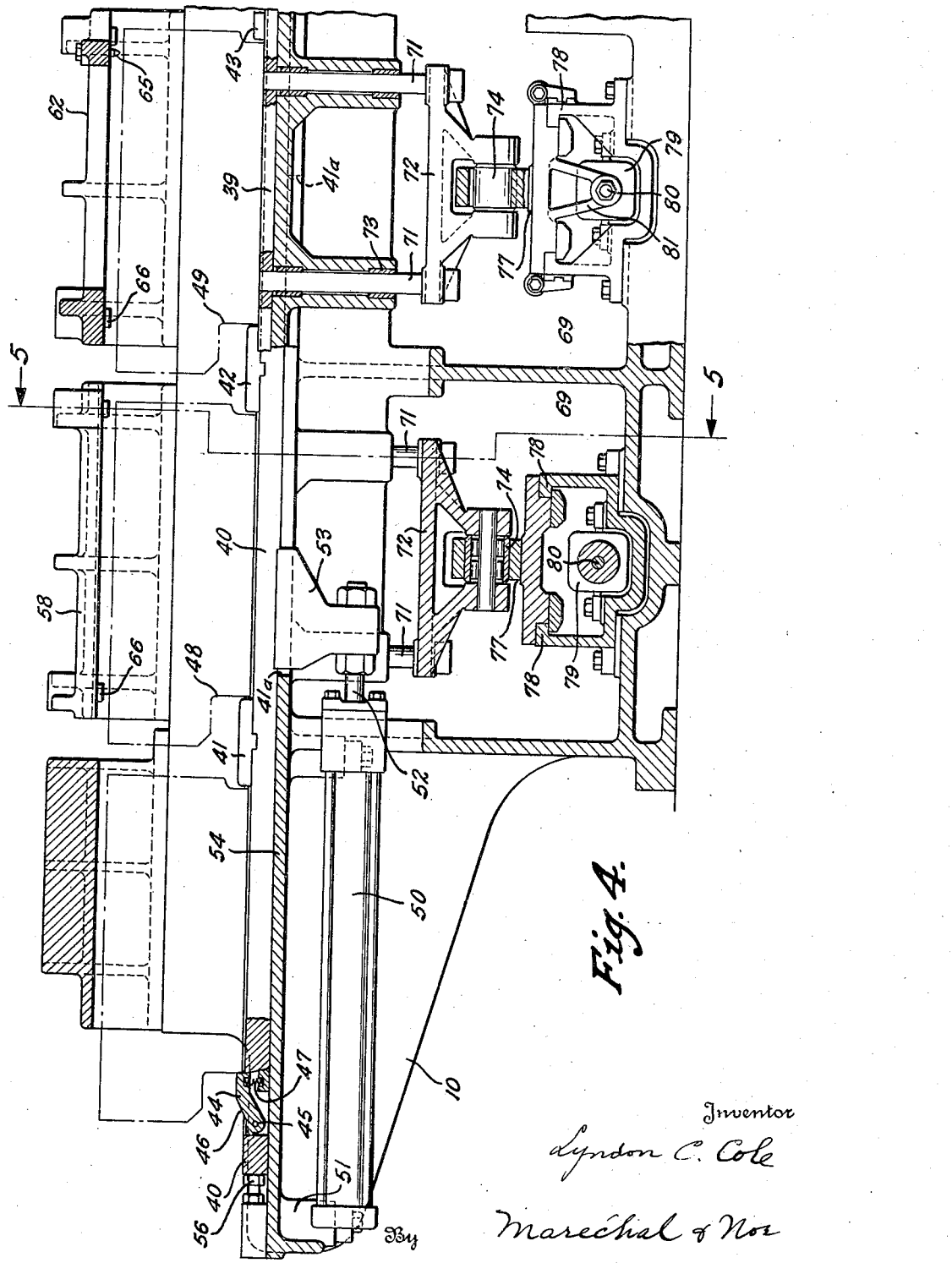

Patented Dec. 21, 1937

2,103,147

UNITED STATES PATENT OFFICE 2,103,147

MACHINE TOOL

Lyndon C. Cole, Hamilton, Ohio, assignor to General Machinery Corporation, Hamilton, Ohio, a corporation of Delaware Application June 14, 1935, Serial No. 26,550
Renewed May 10, 1937

14 Claims. (Cl. 29—33)

This invention relates to machine tools, and more particularly to machine tools having provision for moving work pieces from a loading station to a cutting station or from one cutting station to another.

One object of the invention is the provision of a machine tool having work cutting means at a cutting station, and having a reciprocably operable feeding mechanism for feeding work pieces in a step by step manner up to and through the cutting station or stations.

Another object of the invention is the provision of a machine tool having a plurality of cutting stations where different cutting operations are carried out on work pieces successively supplied thereto, the work pieces being moved forwardly from the loading station to the cutting stations by a reciprocably movable feeding bar having lugs adapted for engagement with the work pieces for positioning the work pieces at the end of a feeding step.

Another object of the invention is the provision of the machine tool adapted for performing desired operations on work pieces which are moved forwardly in a step by step manner, there being provision for raising the work pieces at the end of a feeding step into engagement with a stop and above the level of the feeding device so the latter can return while the work pieces are stationary at cutting positions.

Other objects and advantages of the invention will be apparent from the following description, the appended claims and the accompanying drawings, in which—

Fig. 2 is an end elevation of the machine tool shown in Fig. 1;

Fig. 3 is a top plan view of a portion of the work supporting table, showing the stop members with which the tops of the work pieces are engageable;

Fig. 4 is a longitudinal section through the work supporting table taken on the line 4—4 of Fig. 3;

Fig. 5 is a transverse section taken on the line 5—5 of Fig. 4;

Fig. 6 is a plan view of a portion of the righthand end of the work supporting base; and Fig. 7 is a perspective view of a bearing portion of an engine block showing how the bearing grooves may be cut in accordance with the present invention.

Figure 1:
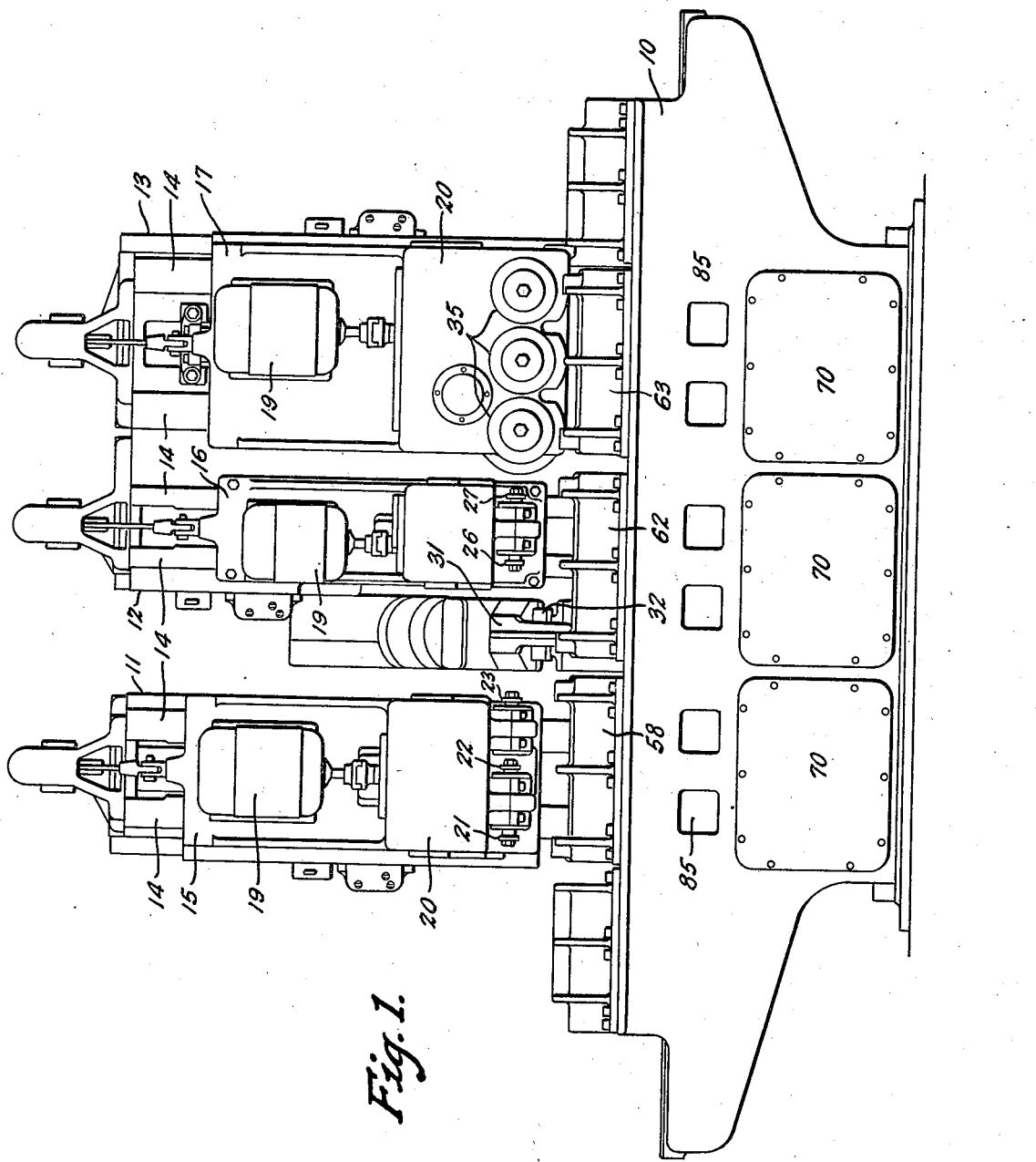
Fig. 1 is a front elevation of a machine tool embodying the present invention.

Referring more particularly to the drawings by reference numerals, 10 generally designates a stationary frame or base of a machine tool, which, in accordance with the preferred form of the invention, is adapted to carry out a plurality of different cutting operations on a successive series of work pieces which are supplied in a step by step manner to the different cutting stations. As herein described, the invention is shown as adapted to carry out a plurality of different operations including milling and drilling operations, on a portion of the cylinder block of an internal combustion engine. The cylinder blocks are supplied in any desired manner to the loading station of the machine tool, and are then moved by a feeding means of novel construction to and through the several cutting stations where the desired cutting operations are performed during the time the work is stationary.

As herein illustrated, the particular operations carried out by the particular cutting tools shown, for purposes of illustration, are such that at the first cutting station a groove is milled or cut in each of three semi-circular bearing portions of the cylinder block. At the second cutting station two of the three bearing grooves are widened between the ends of the grooves by means of milling cutters the diameters of which are substantially smaller than the diameter of the bearing portion of the cylinder block. At the same station the third bearing portion of the cylinder block is drilled to provide a socket for receiving a portion of the Babbitt or other bearing metal. At the third cutting station the three bearing grooves of the cylinder block are cut transversely to provide a groove in each extending transversely across the bottom of the bearing portions, the various grooves and the drilled hole thus forming anchorages which determine the position of the bearing Babbitt metal or the like, which is subsequently applied to each of the bearing portions of the cylinder block.

While reference has been made to the particular character of the various operations performed by the apparatus, it will be understood that cutting devices of any desired character may be employed for performing other cutting operations on work pieces and that the work pieces may be members of any desired character on which the desired cutting operations are to be performed.

As shown in Fig. 1, the machine tool comprises a plurality of upright standards 11, 12 and 13, provided on the base or frame 10, and having guideways 14, along which the tool heads 15, 16 and 17 are vertically slidable so that they can be moved to lowered cutting positions and then, after the cutting operations have been performed, may be retracted upwardly out of engagement with the work. On each tool head is an operating motor 19 each connected in driving engagement with the respective tool or tools through a suitable transmission mechanism contained in a housing 20. The tool head 15 is adapted for the support and operation of rotatable milling cutters 21, 22 and 23 which are spaced apart on a common axis amounts corresponding to the spacing between the three bearings of the cylinder block. The milling cutters 21, 22 and 23 are thus adapted to cut a groove concentrically in each of the three bearing portions of the cylinder block. Such a groove is indicated at 24 on the semi-circular bearing portion 25 shown in Fig. 7.

At the second cutting station, the tool head 16 carries and drives two milling cutters 26 and 27, spaced the same distance apart as the milling cutters 22 and 23, and adapted to cut wider grooves of shorter length as indicated by numeral 29 in Fig. 7 on two of the bearing portions of the cylinder block, while a recess or socket is drilled in the third bearing portion by means of a drill 30, see Fig. 2, carried by a tool head 31 a portion of which is shown in Fig. 2. This tool head is slidably mounted on a guideway 32 which is inclined at a suitable angle so that the drill may be moved to a cutting position by movement of the tool head 31 in a direction parallel to the drill axis.

At the third cutting station the cutter head 17 carries and drives three milling cutters 35 which rotate in a common plane parallel to the longitudinal axis of the cylinder block, and which are adapted to cut a groove 36 as shown in Fig. 7 in each of the three bearing portions of the cylinder block.

The work carrying portion of the machine tool extends from a loading station shown at the left as viewed in Fig. 1, through the several cutting stations, and also provides an unloading station at the right-hand end of the machine. The cylinder blocks are applied by any suitable lifting or carrying device to the loading station, the forward portions of the cylinder block being pushed between the side guiding walls 38, the lower portions of the cylinder block sliding on two parallel longitudinally extending tracks or guide rails 39. Between the guide rails or tracks 39 is a longitudinally extending feed member or bar 40 having a plurality of upwardly extending lugs 41, 42 and 43 fixed rigidly thereon and spaced apart a distance slightly exceeding the distance between the ends of the cylinder block at the bottom of the block where it rests over the bar 40 (see Fig. 4). At the feeding station, the bar 40 is provided with a feeding lug 44, which is preferably pivotally supported thereon at 45 in a longitudinal recess in the bar so that the bottom of a cylinder block may be shoved along the guide rails 39 over the lug 44, which is thus cammed downwardly by reason of its inclined side 46, a spring 47 serving to push the lug 44 upwardly to the position shown in Fig. 4 after the cylinder block has been moved forwardly clear of the forward end of the lug and into engagement with the rear side of the lug 41.

In this position, the cylinder block is ready to be moved forwardly from the loading station to the first cutting station. Numeral 48 indicates a cylinder block at the first cutting station and 49 indicates a cylinder block at the second cutting station.

The line of cylinder blocks is moved forwardly so as to advance the cylinder block from the loading station and to advance the other cylinder blocks to the next succeeding stations by means of the feeding bar 40 which is moved to the right from the position shown in Fig. 4, at the proper time in the sequence of operations, so as to advance each cylinder block through an amount corresponding to the distance between successive cutting stations. As herein shown, the bar 40 is moved by means of a fluid pressure device comprising a cylinder 50, one end of which is secured to a projection 51 fixed at the end of the base or stationary frame 10, the piston 52 of the fluid pressure device being connected to an arm 53 which is fixed to the bottom of the bar 40 and which operates in a longitudinal slot 41ª provided in the horizontal wall 54 of the base 10. When liquid or other fluid is supplied to the left-hand end of the cylinder 50 (see Fig. 4), under controlled pressure, the piston 52 will be moved to the right and advance the bar 40 until the latter comes up into engagement with a fixed stop 55 provided at the right-hand end of the base 10 and corresponding in construction to the stop 56 which limits the left-hand or return movement of the bar 40. The two stops 55 and 56 are preferably screws adjustably threaded in the base. The bar 40 is returned by supplying pressure fluid to the right-hand end of the cylinder 50 at the proper time in the sequence of operations to return the bar to its initial position ready for a subsequent feeding stroke.

When the bar 40 is moved forwardly, each cylinder block is pushed along by one of the feeding lugs. Thus, in moving the cylinder block 48 from the position it is shown in Fig. 4, when the bar 40 is advanced the rear end of the cylinder block 48 is pressed by the front side of the lug 41. When the feed bar stops instantly at the end of a feeding stroke, the cylinder block 48 continues to move forwardly a little distance by reason of its own inertia, since the bar movements are comparatively rapid especially toward the end of a feeding stroke. The forward end of the cylinder block 48 is thus brought up into engagement with the rear side of the lug 42 at the end of the advancing stroke of the feeding bar, so as to position the cylinder block rather accurately in vertical alignment with the second cutting station. The slight spacing provided between the cylinder block and one or the other of the lugs at each end of the cylinder block facilitates the mounting of the blocks in the guide rails and does not require extreme uniformity in the lengths of the cylinder blocks where the latter are engaged between the feeding lugs.

At the end of the feeding stroke of the bar 40, the several cylinder blocks which are then arranged at the three cutting stations are moved vertically upwardly, above the level of the top of the feeding lugs so that the feeding bar can return toward the left while the work pieces remain stationary in their cutting stations. Above the cylinder block 48 at the first cutting station is a stop frame 58 with which the top of the cylinder block is adapted to contact when the latter is raised upwardly. The stop frame 58 comprises horizontally extending plate portions 59 and 60 which project toward one another from the side walls 61, sufficient space being provided between the horizontal wall portions 59 and 60 to provide for entrance of the milling cutters 21, 22 and 23 and their spindles. A similar stop frame is provided at the second and third cutting stations. The stop frames 62 and 63 of the second and third cutting stations are shown in Figs. 3 and 6.

As shown in Figs. 3 and 5 the stop frame 58, like the other stop frames at the other cutting stations, is provided with two tapered locating pins 65 which are adapted to be received in two holes drilled in each cylinder block and having a definite location with respect to the bearing portions of the cylinder block, so that when the cylinder block is moved upwardly into engagement with the four flat abutment plates 66, the locating pins 65 will cause any slight shifting movement required of the cylinder block to very accurately determine its position exactly in the cutting position. A plunger 67, urged downwardly by a strong spring 68 may be provided in one or more of the plates 66 for yielding engagement with the top of the cylinder block so as to force the latter downwardly after the cutting operation is completed. When the cylinder block is moved up into engagement with the stop surfaces 66 and positioned by the tapering pins 65, the block is in position ready for the milling or other cutting operation to be performed.

The cylinder blocks are moved upwardly into engagement with the stop frames at each cutting station, as herein shown, by means of fluid pressure operated mechanisms of similar construction, and provided below the work pieces in the compartments 69 provided in the base or frame 10, and accessible through removable cover plates 70 which are bolted in place at the front of the machine. At the first cutting station, for example and as shown in Figs. 4 and 5, elevating pins 71 are secured to an elevating plate 72 and are movable endwise through bearings 73 so that when the pins are raised the upper ends of the pins project upwardly from their normal position even with the upper surface of the guide rails 39, and at opposite sides of the rails.

As viewed in Figs. 4 and 5 the elevating pins are in their lowered position, the rotatable roller 74 which carries the elevating plate 72 being arranged at the lower end of an inclined cam slot 76 of cam plate 77. The latter is slidably guided for horizontal movement on fixed guideways 78 and is positioned by means of a fluid pressure cylinder 79, supported in fixed position, and having a piston rod 80 which is connected to a bracket 81 fixed to the end of the cam plate 77. When fluid is supplied to the left end of the cylinder 79 the piston rod is moved to the right, thus moving the cam plate 77 to the right from the position shown in Fig. 5, and producing an elevation of the elevating plate 72 and of the elevating pins 71. The supply of fluid to the cylinder 79 for moving the cam plate 77 in either direction is effected at the proper times in the sequence of operations so as to raise the cylinder block after the completion of a forward or feeding step of the bar 40, and just before the cutting heads at the several cutting stations are lowered into cutting positions. A similar elevating mechanism is provided at each cutting station, and the several elevating pins at the several cutting stations are raised simultaneously, and are also lowered simultaneously after the cutting operations at the several cutting stations have been completed and the cutting heads raised. The lowering movement of the elevating pins 71 at the several cutting stations takes place just before the start of a feeding or advancing stroke of the bar 40, the timing of the various control members being effected in any desired manner so that one operation takes place automatically after a preceding operation has been completed.

As will be apparent from Figs. 1 and 5 there is suitable provision for the disposal of the chips produced during the cutting operations of the several cutting tools. At each side of the guide rails 39, on which the work pieces are supported, there are downwardly and outwardly inclined passages 84 terminating in openings 85 through which the chips can pass so that there will never be a large accumulation of chips on or adjacent to the guide rails 39. If, however, a few chips do find their way onto the guide rails 39 the accurate positioning of the work pieces at the cutting stations will not be seriously interfered with, because the work pieces are raised up above the guide rails 39 when positioned for a cutting operation. The upper surfaces of the cylinder blocks are thus raised against a downwardly facing locating surface on which it is impossible for chips to collect, so there will be assurance of accurate positioning of the cylinder blocks in exactly predetermined relationship with respect to the positions of the cutters of the tool heads.

While the form of apparatus as herein described constitutes a preferred embodiment of the invention, it is to be understood that the invention is not limited to this precise form of apparatus, and that changes may be made therein without departing from the scope of the invention which is defined in the appended claims.

What is claimed is:

1. A machine adapted for cutting operation on work pieces supplied thereto comprising a base having work cutting means mounted thereon for movement to a cutting position at a cutting station, a work guide for slidably supporting work pieces for movement from a loading station to the cutting station, a work advancing member having work engaging lugs spaced thereon so that limited movement is provided between work pieces and lugs in the direction of the line of advance, the lugs being so spaced on the work advancing member that a work piece is positioned at a cutting station by its own inertia at the end of an advancing step by engagement with the rear portion of a lug, and means for reciprocably moving said work advancing member.

2. A machine adapted for cutting operation on work pieces supplied thereto comprising a base having work cutting means mounted thereon for movement to a cutting position at a cutting station, a work guide for slidably supporting work pieces for movement from a loading station to the cutting station, a work advancing member having work engaging lugs spaced thereon so that limited movement is provided between work pieces and lugs in the direction of the line of advance, the lugs being so spaced on the work advancing member that a work piece is positioned at a cutting station by its own inertia at the end of an advancing step by engagement with the rear portion of a lug, means for reciprocably moving said work advancing member, and means for relatively moving the work and lugs in a direction transverse to the line of advance after completion of an advancing step of the work advancing member so the latter can return while the work is stationary at a cutting station.

3. A machine adapted to perform successive cutting actions on work pieces supplied thereto comprising a base, a plurality of cutter heads mounted thereon for movement to cutting positions at a plurality of cutting stations, a work guide for slidably supporting a series of work pieces for successive movement to the cutting stations, a work advancing member having work engaging lugs spaced thereon so that each work piece is positioned by its own inertia at the end of an advancing step by engaging with the rear portion of a lug, means for reciprocably moving said work advancing member, and means for relatively moving the work pieces and the lugs in a direction transverse to the line of advance after completion of an advancing step of the work advancing member so the latter can return while the work is stationary.

4. A machine having a loading station and a cutting station and adapted for cutting operation on work pieces supplied thereto comprising a base having work cutting means mounted thereon for movement to a cutting position at the cutting station, a work guide for slidably supporting work pieces for movement from the loading station to the cutting station, a work advancing member having work engaging lugs spaced thereon so that limited movement is provided between work pieces and lugs in the direction of the line of advance, the lugs being so spaced on the work advancing member that a work piece is positioned at the cutting station by its own inertia at the end of an advancing step by engagement with the rear portion of a lug, means for reciprocably moving said work advancing member, stationary stop means above the work, means for raising the work into engagement with said stop means and above the level of said lugs, and means for advancing and returning said work advancing member.

5. A machine having a loading station and a cutting station and adapted for cutting operation on work pieces supplied thereto comprising a base having work cutting means mounted thereon for movement to a cutting position at the cutting station, a work guide for slidably supporting work pieces for movement from the loading station to the cutting station, a work advancing member having work engaging lugs spaced thereon, means for reciprocably moving said work advancing member, stationary stop means above the work, means for raising the work into engagement with said stop means and above the level of said lugs, and means for advancing and returning said work advancing member, said base having downwardly and outwardly inclined passageways extending from opposite sides of said work guide for the disposal of chips produced by the cutting operation.

6. A machine adapted to perform successive milling operations on work pieces supplied thereto comprising a base, a plurality of milling cutters mounted on said base for movement to cutting positions at a plurality of cutting stations, a work guide for slidably supporting a series of similar work pieces for successive movement to the cutting stations, a work advancing bar having work engaging lugs fixed thereon and spaced apart so that each work piece is positioned by its own inertia at the end of an advancing step by engagement with the rear portion of a lug, stationary stop means at each cutting station, means for reciprocably moving said bar to advance the work step by step through the successive cutting stations, and means for raising the work pieces above the bar into engagement with said stop means after completion of an advancing step of the bar so the bar can return while the work pieces are stationary at the cutting stations, said stop means having locating means cooperating with the work pieces to accurately locate the work at the cutting stations.

7. A machine adapted to perform successive cutting actions on work pieces supplied thereto comprising a base, a plurality of cutter heads supported thereon for movement to cutting positions at a plurality of cutting stations, a work guide for slidably supporting a series of similar work pieces for successive movement through the several cutting stations, a work advancing bar having work engaging lugs spaced thereon and projecting therefrom for engagement with the work pieces, means for reciprocably moving said bar a distance corresponding to the spacing between successive cutting stations, stop means at each cutting station adapted for engagement with the top of the work pieces and means for raising the work pieces into engagement with the stop means and above the level of the top of said lugs so the bar can return while the work is stationary.

8. A machine adapted to perform successive milling and other cutting actions on work pieces supplied thereto comprising a base, a plurality of cutter heads mounted thereon for movement to cutting positions at a plurality of cutting stations, a fixed horizontal work guide extending past the cutting stations and having a top surface on which a series of work pieces is slidably supported, reciprocable work advancing means for advancing the work pieces step by step and for returning while the work is stationary, stop means above said work guide at each cutting station for engaging the top of the work pieces, and fluid pressure operated means for raising the work pieces into engagement with said stop means at the end of an advancing step so as to free the work pieces from the work advancing means.

9. In a machine having a plurality of cutting stations and adapted to perform successive cutting actions on work pieces, spaced longitudinally extending fixed work supporting guide members for slidably supporting the work pieces, spaced longitudinally extending side guides fixed relatively to the work supporting guide members for guiding the sides of the work pieces; a work advancing bar reciprocably mounted between said guide members and having work engaging lugs rigid thereon and projecting upwardly therefrom and adapted for pushing engagement with the work pieces, stop means at the cutting stations adapted for engagement with the top portions of the work pieces, a series of elevating pins at each cutting station for raising the work pieces into engagement with the stop means and above the level of said lugs, and means for reciprocably moving said pins.

10. A machine adapted for milling operations on internal combustion engine blocks supplied thereto comprising a base having work cutting means mounted thereon at a cutting station, a fixed support on which the engine blocks are slidably mounted, a reciprocable work advancing member having work engaging means positioned thereon at spacing coordinated to the stroke of said member for advance of work pieces a predetermined step to and from the cutting station, means for reciprocably moving said work advancing member, and means for moving the work in a direction transverse to the line of advance after completion of an advancing step of said work engaging member, to a clearance position with respect to the work advancing means at the cutting station so the work advancing means can return while the work is stationary.

11. A machine adapted to perform milling and other cutting actions successively on work pieces supplied thereto comprising a base, a plurality of cutter heads mounted thereon for up and down movement to cutting positions at a plurality of cutting stations, a fixed work guide for slidably supporting a series of work pieces for successive movement thereupon to the cutting stations, reciprocable work advancing means having work engaging portions engageable with the work to advance the same a predetermined step and return while the work is stationary, and means for relatively moving said work pieces and work advancing means in a direction transverse to the line of advance after completion of an advancing step of said work engaging portions so the latter can return while the work is stationary.

12. A machine adapted to perform successive cutting actions on work pieces supplied thereto, comprising a base, a plurality of cutter heads supported thereon for downward movement to cutting positions at a plurality of cutting stations, a work guide for slidably supporting a series of similar work pieces for successive movement through the several cutting stations and adapted to assume the entire weight of the work pieces, work advancing means having work engaging portions projecting therefrom and engageable with the work to advance the same a predetermined distance from one cutting station to the next, stop means at each cutting station adapted for engagement with the top of the work pieces, and means for raising the work pieces into engagement with the said stop means and above the path of advancing movement of the said work engaging portions so as to separate the work pieces from the work advancing means.

13. A machine adapted for cutting operations on work pieces supplied thereto comprising a base having a tool mounted thereon at a cutting station for movement to work engaging position, a work supporting guideway for slidably supporting work pieces for movement past said cutting station, means for feeding the work pieces successively past said cutting station, a stop surface having a definite location with respect to said base, and means for moving a work piece transversely of the line of advance and against said stop surface after completion of an advancing step of the work feeding means.

14. A machine adapted for cutting operations on work pieces supplied thereto comprising a base having a tool mounted thereon at a cutting station for movement to work engaging position, a work supporting guideway for slidably supporting work pieces for movement past said cutting station, means for feeding work pieces successively past said cutting station, a fixed stop surface having a definite location with respect to said base, and means for moving the work pieces off of said guideway and against said stop surface after completion of an advancing step of the work feeding means.

LYNDON C. COLE.